(12) United States Patent
Kim et al.

(10) Patent No.: US 7,620,011 B2
(45) Date of Patent: Nov. 17, 2009

(54) CHANNEL TIME ALLOCATION METHOD IN HIGH RATE WPAN

(75) Inventors: Yong-suk Kim, Daejeon (KR); Won-yong Yoon, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 927 days.

(21) Appl. No.: 10/838,516

(22) Filed: May 5, 2004

(65) Prior Publication Data

US 2005/0002362 A1    Jan. 6, 2005

(30) Foreign Application Priority Data

May 13, 2003    (KR)    ............... 10-2003-0030087

(51) Int. Cl.
*H04L 1/00* (2006.01)
(52) U.S. Cl. .................. 370/329; 370/328; 370/330
(58) Field of Classification Search ............... None
See application file for complete search history.

(56) References Cited

U.S. PATENT DOCUMENTS

| | | | | |
|---|---|---|---|---|
| 5,384,777 | A * | 1/1995 | Ahmadi et al. | 370/337 |
| 5,960,001 | A * | 9/1999 | Shaffer et al. | 370/448 |
| 2002/0057709 | A1 * | 5/2002 | Edmon et al. | 370/442 |
| 2003/0137970 | A1 * | 7/2003 | Odman | 370/350 |
| 2003/0152059 | A1 * | 8/2003 | Odman | 370/338 |
| 2004/0072573 | A1 * | 4/2004 | Shvodian | 455/450 |

FOREIGN PATENT DOCUMENTS

| | | | |
|---|---|---|---|
| JP | 2001-223716 | A | 8/2001 |
| KR | 2001-0028103 | A | 4/2001 |
| WO | WO 01/89153 | A2 | 11/2001 |

OTHER PUBLICATIONS 802.15.3 Overview Update, 'Online!, Oct. 2002, pp. 1-23, XP002293572.
Draft D17 Clause 7.6 Security Recommendation for Low-Rate IEEE 802.15.4 WPAN, 'Online! Nov. 2002, pp. 1-130, XP002293573.
IEEE Samsung MAC Enhancement Contribution for IEEE 802.15 Task Group 3A, Online! May 2003, pp. 1-17, XP002293574.
Some Considerations on MLME and MAC SAPS, Access Mechanisms, and Frame Types and Formats for 802.15.3 MAC, 'Online! Dec. 2000, pp. 1-16, XP002293575.
Index of /15/pub/2003/May03, [Online] Apr. 3, 2007, pp. 1-4, XP000863878 IEEE Retrieved form the Internet: URL:http://www.ieee802.org/15/pub/2003/May03/ [retrieved on Apr. 3, 2007].
Alltheweb, [Online] Jul. 6, 2006, pp. 1-2, XP000863879 Alltheweb Retrieved from the Internet: URL: http://www.alltheweb.com [retrieved on Jun. 7, 2006].

* cited by examiner

*Primary Examiner*—Charles N Appiah
*Assistant Examiner*—Jaime M Holliday
(74) *Attorney, Agent, or Firm*—Sughrue Mion, PLLC

(57) ABSTRACT

Disclosed is a channel time allocation method in a high rate WPAN and a wireless system using the same. In the WPAN environment synchronized by a synchronization signal broadcasted from a coordinator, the channel time allocation method includes transmitting a channel time allocation request command corresponding to a property of an application data to be transmitted to the coordinator by any one of devices linked to the WPAN, and the coordinator allocating the channel time, inserting information of the allocated channel time to the synchronization signal, and broadcasting the synchronization signal to the devices. Accordingly, the channel time is allocated to fit for the property of the VBR stream data such as the MPEG-2 video so that the QoS of the VBR stream is provided. At the same time, reliability of the transmission of I frame is enhanced so that success rate of decoding the frame is increased.

15 Claims, 8 Drawing Sheets

FIG. 4

| octets: 1 | 1 | 2 | 2 | 1 | 1 | 1 | 1 | 1-127 | 1 |
|---|---|---|---|---|---|---|---|---|---|
| Desired number of TUs | Minimum number of TUs | CTR TU | CTR Interval | CTR Control | Stream index | Stream request ID | PS set index | Target ID list | Num targets |

| bits: b7 | b6 | b5 | b4 | b3 | b2-b0 |
|---|---|---|---|---|---|
| Target ID List type | CTR interval type | CTA type | CTR type | Stream termination | Priority |

FIG. 5

| Octets:2 | 2 | 2 | 1 | 1 | 1 | 1 | 1 |
|---|---|---|---|---|---|---|---|
| Btime | Ptime | Itime | M | N | Frame rate | Len | Type |

CHANNEL TIME ALLOCATION METHOD IN HIGH RATE WPAN

CROSS-REFERENCE TO RELATED APPLICATIONS

This application claims the priority of Korean Patent Application No. 2003-30087, filed May 13, 2003 in the Korean Intellectual Property Office, the disclosure of which is incorporated herein by reference.

BACKGROUND

1. Field of the Invention

The present invention relates to a channel time allocation method and a wireless system using the same, and more specifically, to a channel time allocation method for efficiently supporting a variable bit rate (VBR) stream such as MPEG-2 video in a wireless personal area network and a wireless system using the same.

2. Description of the Related Art

A Wireless Personal Area Network (hereinafter, refer to as "WPAN") is an implementation of Personal Area Network (PAN) in wireless connection. In contrast to a Local Area Network (LAN) or a Wide Area Network (WAN) that are widely known technologies, the PAN is a network owned by an individual person. That is, devices owned by the individual person are interconnected to construct the network in order to provide convenience for the individual person.

To implement the PAN with the wireless connections, Institute of Electrical and Electronics Engineers, Inc. (IEEE) 802.15 Working Group developed the WPAN for short distance wireless network standard, having four Task Groups. IEEE 802.15.1 standard is the well-known Bluetooth, IEEE 802.15.3 standard is a high rate WPAN, and IEEE 802.15.4 standard is a low rate WPAN.

The WPAN for the short distance wireless network supports various electronic devices including portable computing devices such as personal computer (PC), personal digital assistant (PDA), wireless printer, storage device, mobile phone, and set-top box. Furthermore, the high rate WPAN complies with the IEEE 802.15.3 standard or an IEEE 802.15.3a standard (hereinafter, refer to as 'IEEE 802.15.3x'), and the IEEE 802.15.3a standard is improved from the IEEE 802.15.3 standard. The high rate WPAN enables a transmission of a real-time video, a high-quality audio, and a high-capacity file. That is, a critical field of application in the high rate WPAN is a multimedia streaming, for example, reproducing data on a TV screen from a digital camcorder or storing a video file at the PC. In order to support a multimedia Quality of Service (QoS) function, the IEEE 802.150.3x standard is configured to periodically have a Contention Free Period (CFP) and to use a Time Division Multiple Access (TDMA) scheme in the CFP.

However, a Moving Pictures Experts Group (MPEG)-2 video is featured as a variable bit rate stream having a different frame size per second. Accordingly, in supporting the VBR stream with the TDMA scheme, it may cause a waste of time in transmitting a P-frame or a B-frame to allocate a channel time fit for the size of the largest frame. On the other hand, if the channel time is not allocated according to a Peak data rate, there may not be enough time in transmitting the I-frame or the P-frame. Therefore, it is required to allocate the channel time according to the size of each frame. In addition, considering that an error rate of a wireless channel is greater than that of a wired channel and that the I-frame affects decoding of other frames, it is necessary to guarantee transmission reliability of the I-frame.

However, a current channel allocation method has a shortcoming in that it does not properly support the VBR stream such as the MPEG-2 video. That is, since the current channel allocation method allocates the channel time with a fixed sized to a superframe, a requirement for the variable time is not satisfied. Also, the current channel allocating method allocates the channel time having the superframe as a cycle, which is not in accord with a unique periodicity of the VBR stream. Hence, inefficiency may arise when the channel time is not allocated when it is necessary to transmit the frame, or when the channel time is unnecessarily allocated when it is not necessary to transmit the frame.

To solve the above problems, several methods have been proposed for the dynamic allocation of the channel time in the TDMA scheme. The first method is to increase or decrease a slot allocation after examining the current channel utilization of each user or device by a central controller. Specifically, according to the examination result, if the result is larger than the number of pre-allocated slots, the central controller increases the slot allocation, and if the result is not larger than the number of the pre-allocated slots, the central controller decreases the slot allocation. The second method is to dynamically allocate the additional channel time. Specifically, a current queue size of each user is constantly feedbacked to the central controller, and then, the central controller dynamically allocates the additional channel time with reference to the feedback. However, the first method is not appropriate to the VBR stream such as the MPEG-2 video, because the amount of the next channel time allocation is determined by the previous utilization. Also, the second method cannot guarantee to allocate the channel time within a transmission deadline of the current frame, because the additional channel time should be allocated with reference to the currently required channel time. Furthermore, these methods commonly incur an overhead because the central controller has to constantly monitor the current channel utilization or requirement of each user or device.

SUMMARY

The present invention has been devised to solve the above problems, so it is an aspect of the present invention is to provide a channel time allocation method for efficiently supporting a variable bit rate (VBR) stream such as MPEG-2 video in a wireless personal area network.

To accomplish the above aspect, the channel time allocation method according to the present invention comprises the steps of transmitting a channel time allocation request command corresponding to the property of an application data to be transmitted to the coordinator by any one of devices which are linked to the wireless personal area network, and the coordinator allocating the channel time by referencing the command, inserting information of the allocated channel time to the synchronization signal, and broadcasting the synchronization signal to the devices.

The channel time allocation method further comprises the step of transmitting and receiving the application data among the devices based on the channel time information inserted to the synchronization signal. The wireless personal area network is a wireless personal area network (WPAN) complying with IEEE 802.15.3x. In the broadcasting step, the channel time is allocated by adjusting a superframe cycle according to a frame cycle of the application data.

The channel time allocation request command may be generated by attaching a field presenting the property of the application data to a channel time request command. The application data may be a variable bit rate (VBR) stream in the form of MPEG-2 video.

The field representing the property of the application data contains at least one information of the application data type, full length of the attached field, cycle of the channel time allocation, the number of frames of GOP, interval between P frames, time for size of a largest I frame, time for size of a largest P frame, and time for size of a largest B frame. The devices use a layer management of the IEEE 802.15.3x and further contain MLME SAP to transmit the property of the application data to MAC layer management entity (MLME).

A wireless system according to the present invention comprises devices linked to the wireless personal area network and a coordinator to broadcast a synchronization signal to the devices to synchronize them. If any one of the devices transmits a channel time allocation request command corresponding to property of an application data to be transmitted to the coordinator, the coordinator allocates the channel time by referencing the command, inserts information of the allocated channel time to the synchronization signal, and broadcasts the synchronization signal to the devices, and then the devices transmit and receive the application data based on the allocated channel time.

The personal area network is a wireless personal area network (WPAN) complying with IEEE 802.15.3x and the coordinator allocates the channel time by adjusting a superframe cycle according to a frame cycle of the application data. The channel time allocation request command is generated by attaching a field presenting the property of the application data to a channel time request command. The application data is a variable bit rate (VBR) stream in the form of MPEG-2 video. The field presenting the property of the application data contains at least one information of the application data type, full length of the attached field, cycle of the channel time allocation, the number of frames of GOP, interval between P frames, size of a largest I frame, size of a largest P frame, and size of a largest B frame. The devices use a layer management of the IEEE 802.15.3x and further contain MLME SAP to transmit the property of the application data to MAC layer management entity (MLME).

BRIEF DESCRIPTION OF THE DRAWINGS

The above-mentioned aspects and/or the feature of the present invention will be more apparent by describing the exemplary embodiment of the present invention by referring to the appended drawings, in which:

FIG. 4 is a diagram depicting a configuration of conventional channel time request commands;

FIG. 5 is a diagram depicting a field which is attached to the channel time request commands of FIG. 4;

DETAILED DESCRIPTION OF THE EXEMPLARY EMBODIMENT

Hereinafter, the present invention is described in great detail with reference to the attached drawings.

Figure 1:
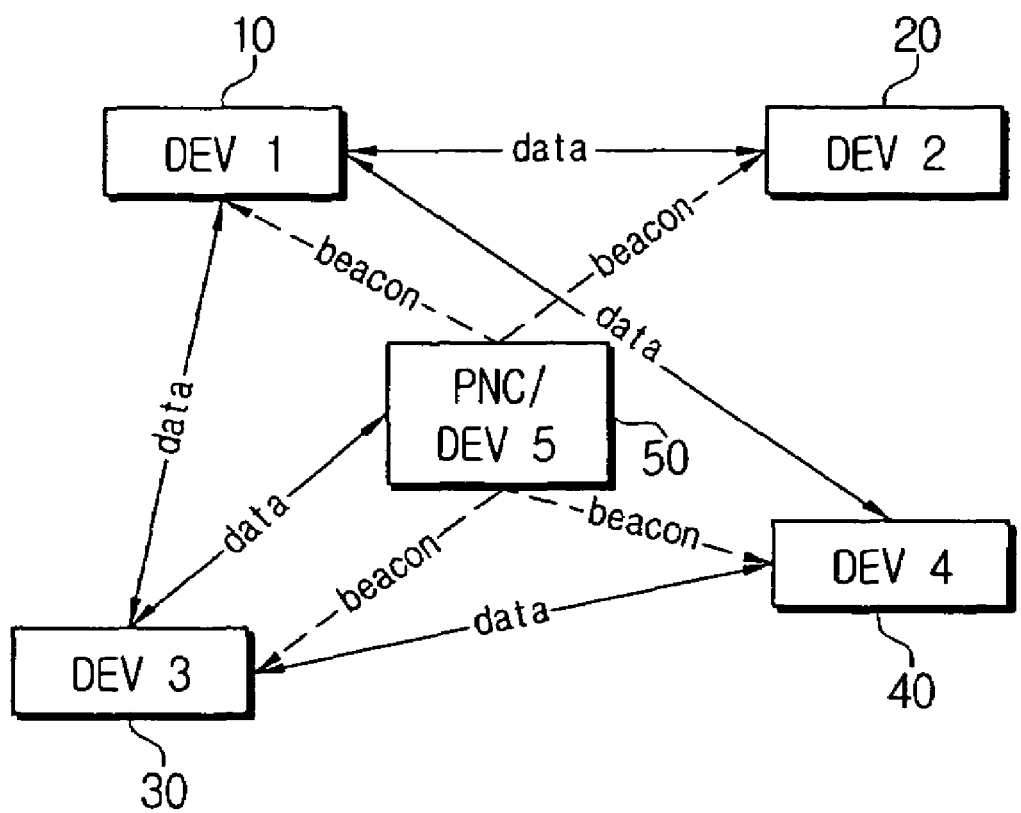
FIG. 1 is a diagram depicting a configuration of a conventional wireless personal area network.

FIG. 1 is a diagram depicting a configuration of a conventional wireless personal area network (WPAN). Referring to FIG. 1, in the WPAN environment, a plurality of data devices (DEV) 10~50 configures a piconet, and the DEV 50 in the piconet is a piconet coordinator (hereinafter, refer to as 'PNC'). The PNC 50 broadcasts a beacon which is a synchronization signal to the other data devices, i.e., DEV1 10, DEV2 20, DEV3 30, DEV4 40, and synchronizes the data devices linked to the piconet.

Figure 2:
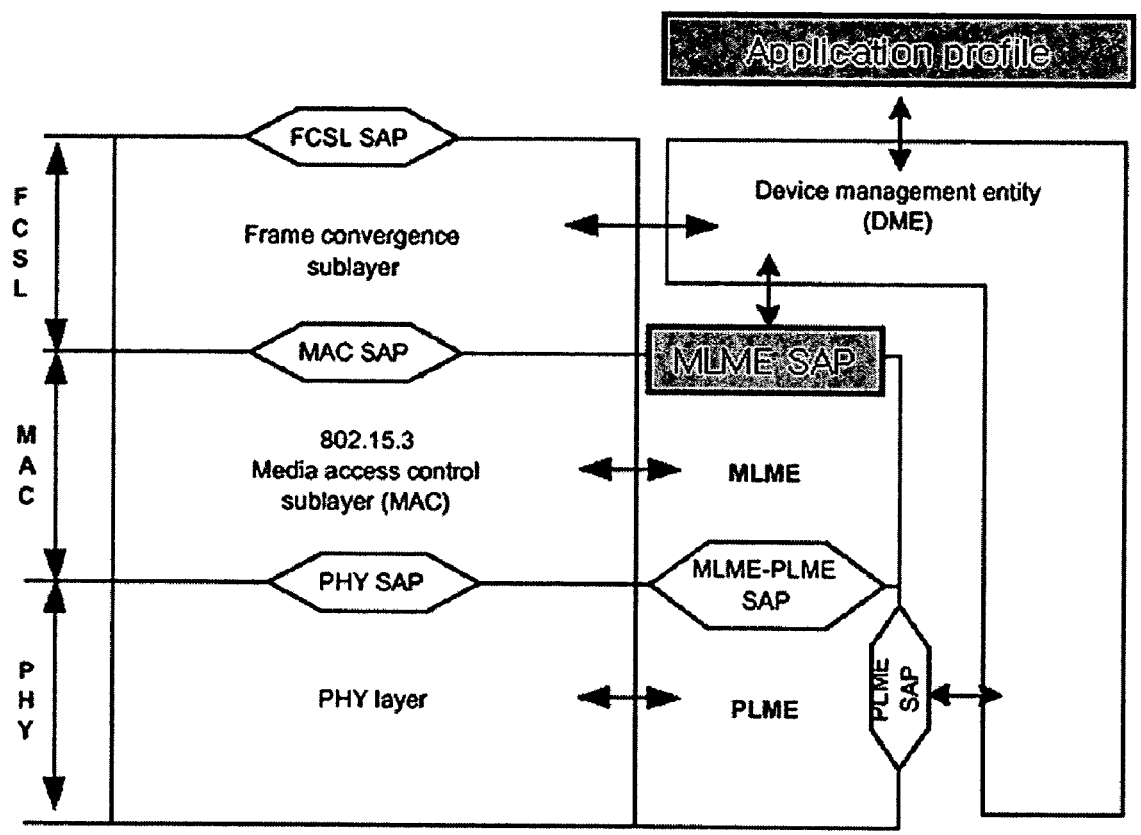
FIG. 2 is a diagram depicting a configuration of data devices to provide a channel time allocation method according to the present invention.

FIG. 2 is a diagram depicting a configuration of the data devices to provide a channel time allocation method according to the present invention. Referring to FIG. 2, the configuration of the data devices is based on a layer management of an Institute of Electrical and Electronics Engineers, Inc. (IEEE) 802.15.3x standard, and only differs in that an application profile above a Device Management Entity (DME) and a Media Access Control (MAC) Layer Management Entity Service Access Point (MLME SAP) are added. A function of the MLME SAP is to request the channel time reflecting a requirement of the application profile.

The application profile is a format for describing property of an application data, and hence, contents of the application profile vary according to the application. According to the prevent invention, the profile of the MPEG-2 video is defined as in the following Table 1.

TABLE 1

| Parameter | Explanation |
| --- | --- |
| frame rate | the number of frames per second |
| N | the number of frame GOP |
| M | interval between predictive frames |
| E | the number of GOPs consisting Envelope |
| Imax | size of the largest I frame in Envelope |
| Pmax | size of the largest P frame in Envelope |
| Bmax | size of the largest B frame in Envelope |

In Table 1, the envelope indicates a bundle of several Groups Of Pictures (GOP), for which the channel time according to a type of the frame is calculated. The entire MPEG-2 video stream is divided into more than one envelope by the parameter E.

Figure 3:
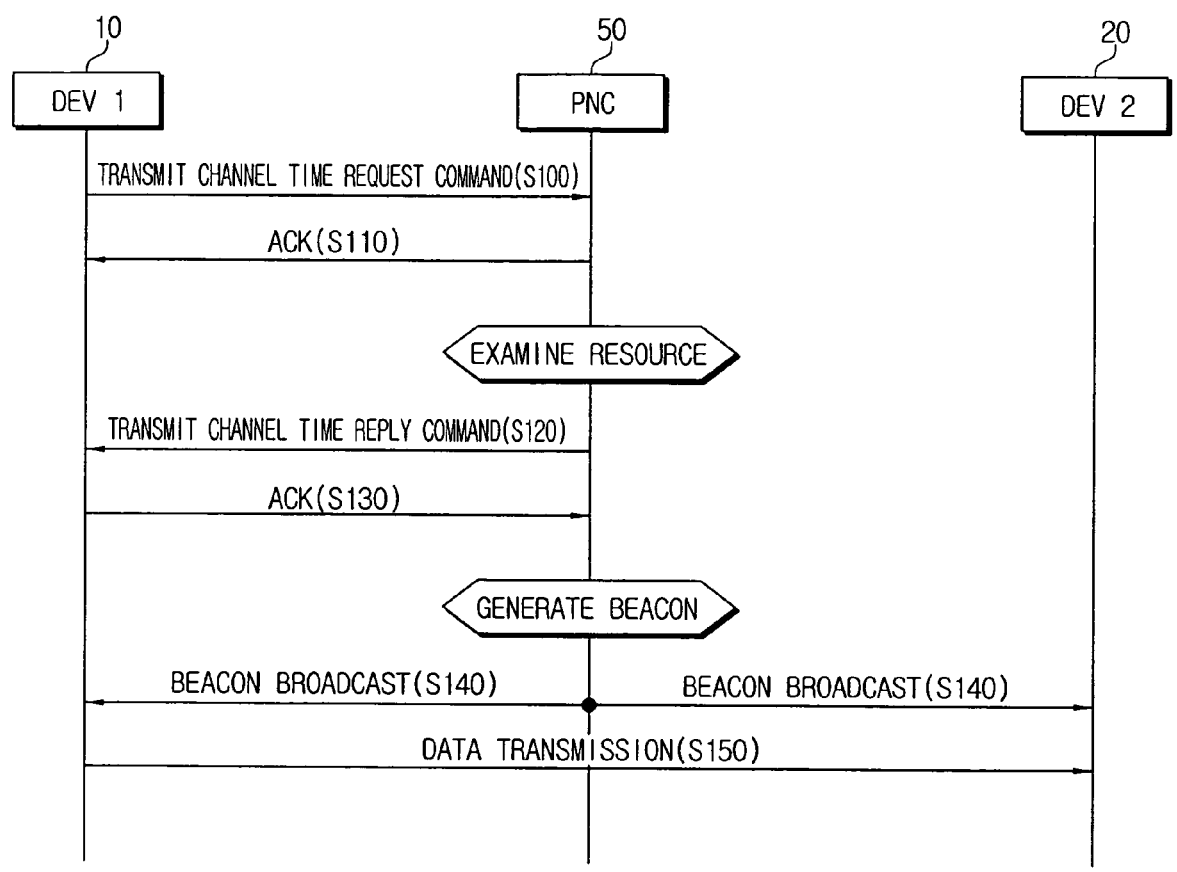
FIG. 3 is a message sequence chart depicting the channel time allocation method according to the present invention.

FIG. 3 is a message sequence chart (MSC) depicting the channel time allocation method according to the present invention. Referring to FIG. 3, the DEV1 10 transmits the channel time request command to the PNC 50 (S100). The channel time request command transmitted from the DEV1 10 to the PNC 50, as shown in FIG. 4, is the channel time request command according to the IEEE 802.15.3x standard to which parameters received from the application are added. That is, a new field as shown in FIG. 5 is attached to an end of the existing channel time request command. Referring to FIG. 5, a Type field indicates a type of the application such as the MPEG-2, and a Len field indicates a length of a following field. A Frame rate field indicates a Channel Time Allocation (CTA) cycle, and a N field and a M field are defined as in Table 1. An Itime field indicates a time corresponding to the size of the largest I field, a Ptime indicates a time corresponding to the size of the largest P field, and a Btime indicates a time corresponding to the size of the largest B field. Hence, the Itime, Ptime and Btime are respectively calculated using values of the parameter Imax, Pmax, and Bmax in Table 1.

Figure 6:
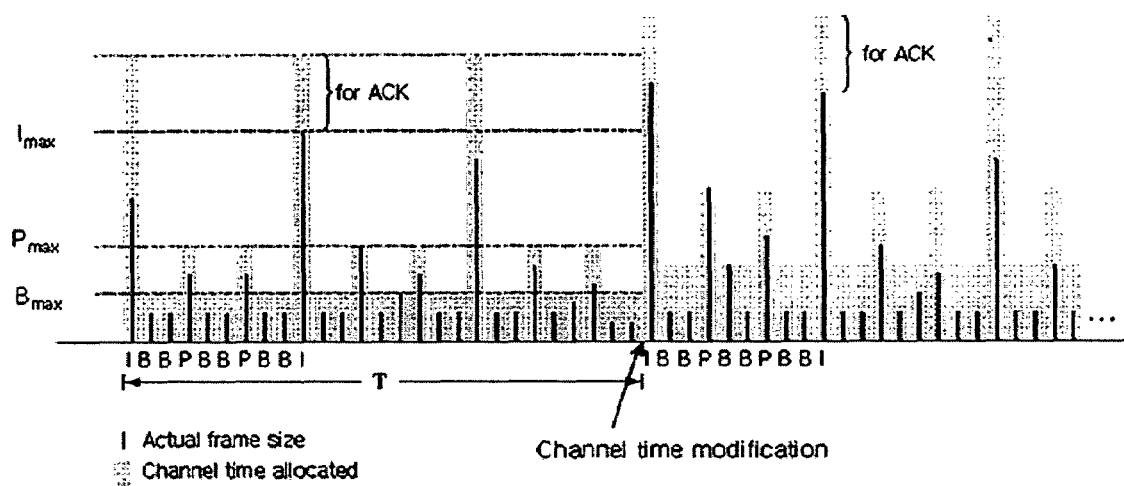
FIG. 6 is a diagram depicting a procedure of calculating Itime, Ptime and Btime.

FIG. 6 shows a procedure to calculate the Itime, Ptime and Btime from the values of the parameter Imax, Pmax and Bmax in each envelope. Referring to FIG. 6, the Itime is a value that a largest value of the I frame in a given envelope are attached to a time for a ACK/retransmission, the Ptime is a largest value of the P frame, and the Btime is a largest value of the B frame.

Meanwhile, a procedure in which the DEV1 10 transmits the channel time request command comprises of the MLME receiving property of the application through the MLME SAP and transmitting a channel time request message to the PNC 50 reflecting the property of the application. That is, since the MPEG-2 stream is divided into the envelopes, every time the values of the parameter Imax, Pmax and Bmax are changed, the changes are notified to the MLME through the MLME SAP, and the MLME transmits an appropriate channel time request command reflecting the changes to the PNC 50 to request the channel time allocation.

Upon receiving the channel time request command from the DEV1 10, the PNC 50 transmits the acknowledgement (ACK) signal to the DEV1 10 (S110). Then, after examining a resource to ensure that the resource is usable or not, the PNC 50 transmits the channel time response command to the DEV1 10 (S120). The DEV1 10 transmits the ACK signal corresponding to the channel time request command to the PNC 50 (S130). The PNC 50 examines the property of the application, which is attached to the channel time request command. After the examination, if an examination result indicates that the type field is MPEG-2, the PNC 50 recognizes the following fields. Accordingly, the PNC 50 modifies the cycle of a current superframe to the frame field of the application so as to prepare a pseudo-static CTA for use. That is, the PNC 50 finds out a frame order from the N and M field attached to the transmitted channel time request command, allocates the superframe time according to the field values of the Itime, Ptime and Btime, and broadcasts these information loaded in a CTA IE (Channel Time Allocation IE) of the beacon (S140).

Upon receiving the information that the channel time is allocated through the beacon, the DEV1 10 and DEV2 20 transmit and receive the application data according to the allocated channel time (S150). Through the above procedure, the channel time for transmitting the VBR stream such as the MPEG-2 video with efficiency is allocated.

Figure 7:
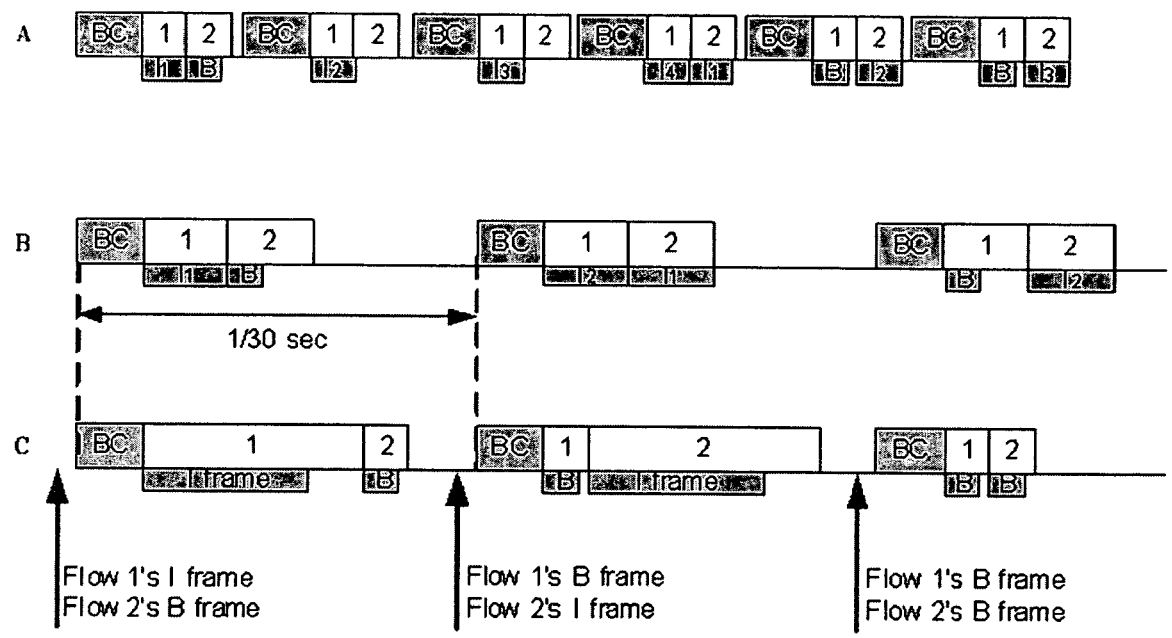
FIG. 7 is a diagram depicting comparison of the present channel time allocation method and the conventional channel time allocation method.

FIG. 7 is a diagram comparing the channel time allocation method according to the present invention and the conventional channel time allocation method. A and B of the FIG. 7 indicate the conventional methods, and C indicates the present method. As shown in FIG. 7, if the sufficient channel time is not allocated for the transmission of the I frame in the conventional method, the I frame is divided into $I_1$, $I_2$, $I_3$, $I_4$ for the transmission (case A), or the I frame is divided into $I_1$, $I_2$ (case B). However, according to the channel time allocation method of the present invention, the channel time is allocated according to the size of the largest I frame to thereby efficiently transmit the I frame at a time.

Figure 8:
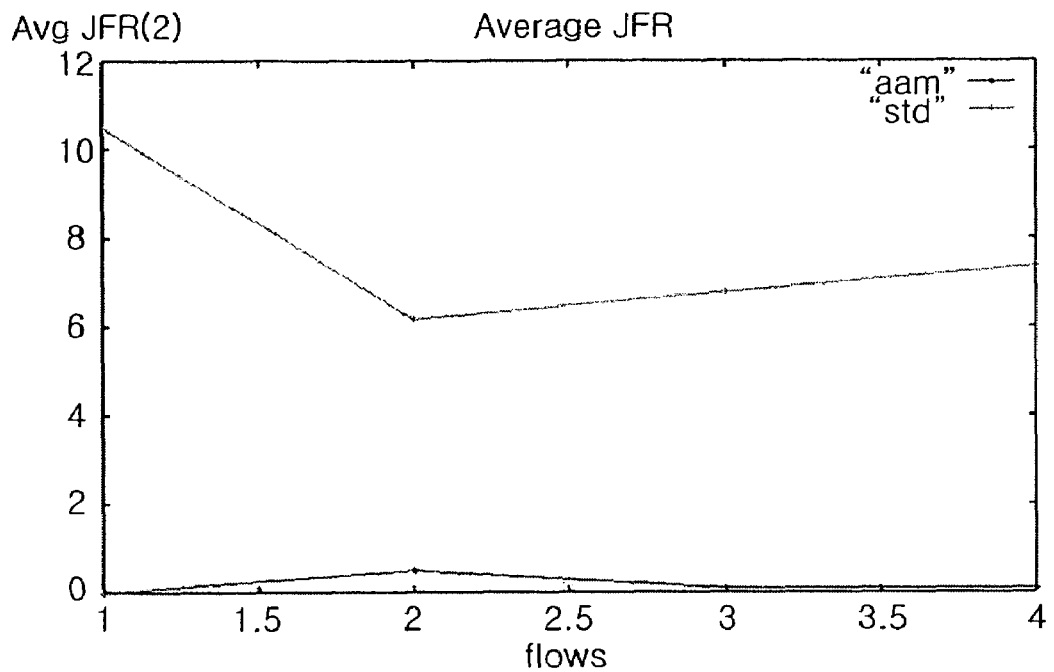
FIGS. 8 through 10 are graphs of simulating results of performances of the present channel time allocation method and the conventional channel time allocation method.
Figure 9:
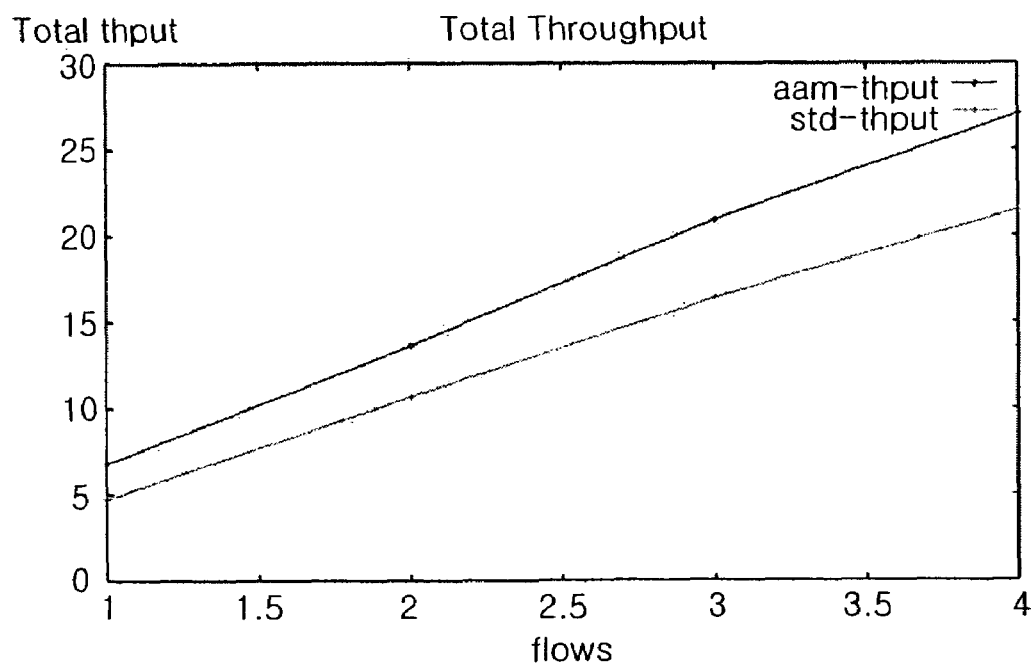
Figure 10:
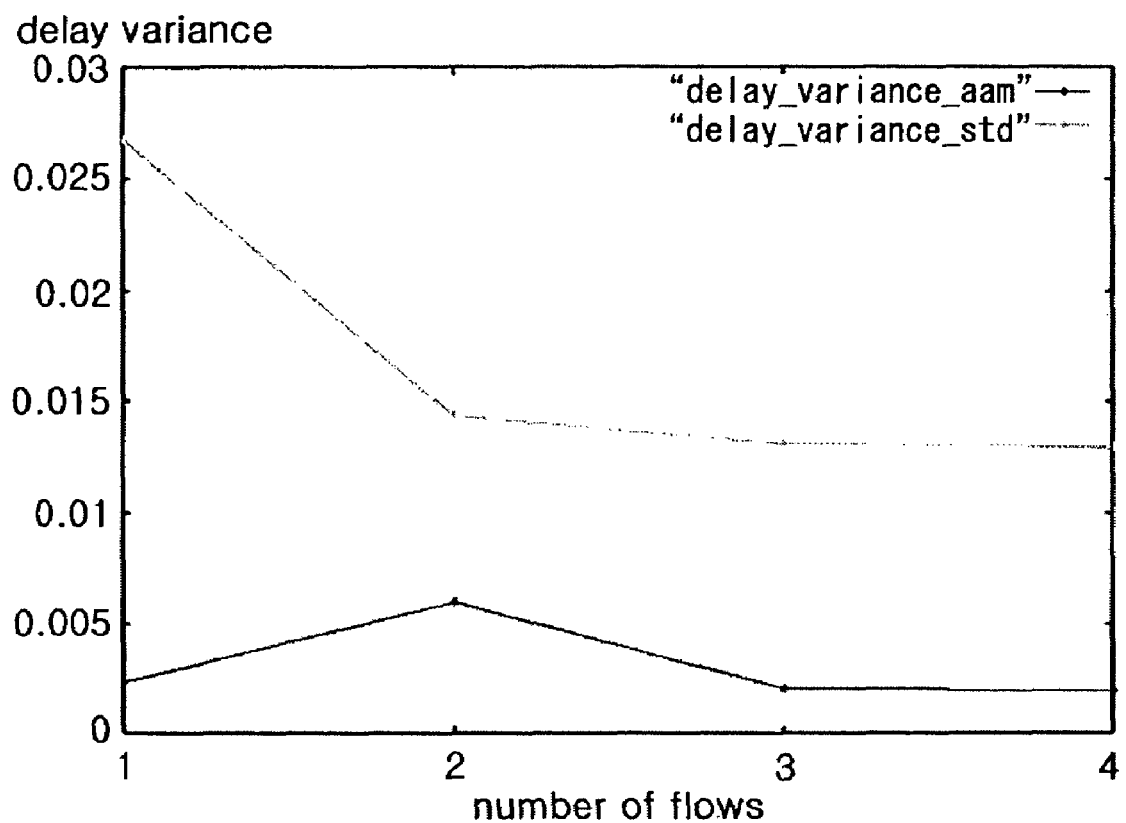

FIGS. 8 through 10 are graphs depicting simulation results of performances of the channel time allocation method according to the present invention and a channel time allocation method according to the IEEE 802.15.3x standard under the same environment. FIG. 8 is a graph of Job Failure Rate (JFR). In FIG. 8, "aam" indicates the JFR of the method according to the present invention, and "std" indicates that of the method according to the IEEE 802.15.3x standard. FIG. 9 is a graph of throughput. In FIG. 9, "amm-thput" indicates the throughput of the method according to the present invention, and "std-thput" indicates that of the method according to the IEEE 802.15.3x. FIG. 10 is a graph of delay variance. In FIG. 10, "delay_variance_amm" indicates the delay variance of the method according to the present invention, and "delay_variance_std" indicates that of the method according to the IEEE 802.15.3x standard.

As shown in FIGS. 8 through 10, the channel time allocation method according to the present invention has the lower JFR and delay variance and the higher throughput, compared with the channel time allocation method according to the IEEE 802.15.3x. Accordingly, using the channel time allocation method according to the present invention, the VBR stream such as MPEG-2 video is processed with more efficiency than the method according to the IEEE 802.15.3x.

As aforementioned, according to the present invention, the channel time is allocated to fit for the property of the VBR stream data such as the MPEG-2 video so that the QoS of the VBR stream is provided. At the same time, reliability of the transmission of the I frame is enhanced so that a success rate of decoding the frame is increased. In addition, by notifying the PNC of the pattern of each stream, the PNC is capable of calculating a schedule for enhancing statistical multiplexing of the streams.

Further, the present invention is applicable to wireless networks including WPAN and other forms of wireless networks.

While the exemplary embodiment of the present invention has been described, additional variations and modifications in that embodiment may occur to those skilled in the art once they learn of the basic inventive concepts. Therefore, it is intended that the appended claims shall be construed to include both the exemplary embodiment and all such variations and modifications as fall within the spirit and scope of the invention.

What is claimed is:

1. A channel time allocation method in a wireless network that is synchronized by a synchronization signal broadcasted from a coordinator, the method comprising:

transmitting to the coordinator by a device linked to the wireless network, a channel time allocation request command including a type of an application data and a property of the application data other than the type; and the coordinator allocating a channel time as an allocated channel time based on the type and the property of the application data in the channel time allocation request command, inserting information of the allocated channel time to the synchronization signal, and broadcasting the synchronization signal to the devices, wherein the channel time allocation request command is generated by attaching a field as an attached field representing the type and the property of the application data to a channel time request command, and wherein the field representing the type and the property of the application data contains the size of the largest I frame, the size of the largest P frame, and the size of the largest B frame.

2. The method of claim 1, further comprising transmitting and receiving the application data among the devices based on the information of the allocated channel time inserted in the synchronization signal.

3. The method of claim 1, wherein the wireless network is a wireless personal area network (WPAN) complying with IEEE 802.15.3x.

4. The method of claim 3, wherein, the channel time is allocated by adjusting a superframe cycle according to a frame cycle of the application data.

5. The method of claim 1, wherein the application data is a variable bit rate (VBR) stream in a form of MPEG-2 video.

6. The method of claim 1, wherein the field representing the type and the property of the application data contains at least one information of an application data type, a full length of the attached field, a number of frames of Group of Pictures (GOP), an interval between P frames, a size of a largest I frame, a size of a largest P frame, and a size of a largest B frame.

7. The method of claim 1, wherein the devices use a layer management of the IEEE 802.15.3x and further contain a media access control layer management entity service access point (MLME SAP) to transmit the property of the application data to a MAC layer management entity (MLME).

8. The method of claim 1, wherein the wireless network is a wireless personal area network.

9. A wireless system operating in a wireless network comprising:
devices linked to the wireless network; and
a coordinator to broadcast a synchronization signal to the devices to synchronize the devices,
wherein if any one of the devices transmits a channel time allocation request command including a type of an application data and a property of the application data other than the type to the coordinator, the coordinator allocates a channel time as an allocated channel time based on the type and the property of the application data in the channel time allocation request command, inserts information of the allocated channel time in the synchronization signal, and broadcasts the synchronization signal to the devices, and the devices transmit and receive the application data based on the allocated channel time, wherein the channel time allocation request command is generated by attaching a field as an attached field representing the type and the property of the application data to a channel time request command, and
wherein the field representing the type and the property of the application data contains the size of the largest I frame, the size of the largest P frame, and the size of the largest B frame.

10. The system of claim 9, wherein the wireless network is a wireless personal area network (WPAN) complying with IEEE 802.15.3x.

11. The system of claim 10, wherein the coordinator allocates the channel time by adjusting a superframe cycle according to a frame cycle of the application data.

12. The system of claim 9, wherein the application data is a variable bit rate (VBR) stream in a form of MPEG-2 video.

13. The system of claim 9, wherein the field representing the type and the property of the application data contains at least one information of an application data type, a full length of the attached field, a number of frames of Group of Pictures (GOP), an interval between P frames, a size of a largest I frame, a size of a largest P frame, and a size of a largest B frame.

14. The system of claim 9, wherein the devices use a layer management of the IEEE 802.15.3x and further contain a media access control layer management entity service access point (MLME SAP) to transmit the property of the application data to MAC layer management entity (MLME).

15. The system of claim 9, wherein the wireless network is a wireless personal area network.

* * * * *